United States Patent [19]

Förster et al.

[11] Patent Number: 5,507,147
[45] Date of Patent: Apr. 16, 1996

[54] METHOD OF SEPARATING VAPOROUS SUBSTANCES FROM AIR SATURATED WITH HIGH PROPORTIONS OF COMPONENTS HAVING A LOW BOILING POINT

[76] Inventors: Hans Förster, Beimsstrasse 59, D-39110 Magdeburg; Wolfgang Leser, Grosser Kamp 35, D-21233 Jesteburg/Lüllau, both of Germany

[21] Appl. No.: 434,541

[22] Filed: May 4, 1995

[30] Foreign Application Priority Data

May 5, 1994 [DE] Germany .................. 44 15 861.0

[51] Int. Cl.$^6$ ....................................... F25J 3/00
[52] U.S. Cl. .................. 62/11; 62/17; 62/20; 62/27
[58] Field of Search ................... 62/11, 20, 27, 62/17

[56] References Cited

U.S. PATENT DOCUMENTS

| | | | |
|---|---|---|---|
| 3,894,942 | 7/1975 | Mair | 62/27 X |
| 3,899,312 | 8/1975 | Kruis et al. | 62/20 X |
| 3,989,478 | 11/1976 | Jones | 62/11 X |
| 4,299,606 | 11/1981 | Robota et al. | 62/28 |
| 4,460,395 | 7/1984 | Nobles et al. | 62/18 |
| 4,617,038 | 10/1986 | Mehra | 62/17 |
| 4,713,940 | 12/1987 | Ranke et al. | 62/17 |
| 4,883,515 | 11/1989 | Mehra et al. | 62/20 X |
| 4,888,035 | 12/1989 | Bauer | 62/20 |
| 5,144,807 | 9/1992 | Brown | 62/20 |
| 5,176,002 | 1/1993 | O'Brien | 62/11 X |
| 5,315,832 | 5/1994 | Hopewell | 62/20 |
| 5,426,945 | 6/1995 | Menzenski | 62/11 |

*Primary Examiner*—Christopher Kilner
*Attorney, Agent, or Firm*—Karl Hormann

[57] ABSTRACT

The invention relates to a method of separating from a gaseous medium vaporous substances having a low boiling point contained in high proportions in the medium, by subjecting said medium to a scrubber where said vaporous substances are precipitated as cold liquid condensates the coldness component of which is transferred to a circulating refrigerant. Provisions are made for different levels of coldness by utilizing cold-vapor and cold-air refrigeration units in which condensates and clean air produced by the system are used as refrigerants. Heat generated by a compressor in the cold-air refrigeration unit may additionally be used in a degassing unit used to remove non-condensible components from the condensate and/or refrigerant.

11 Claims, 2 Drawing Sheets

METHOD OF SEPARATING VAPOROUS SUBSTANCES FROM AIR SATURATED WITH HIGH PROPORTIONS OF COMPONENTS HAVING A LOW BOILING POINT

BACKGROUND OF THE INVENTION

1. Filed of the Invention

The invention, in general, relates to a novel method, compatible with modern ecological standards, of separating vaporous substances from gaseous media, such as, for example, air containing a high proportion of components having a low boiling point, and, more particularly, to a method of separating organic vapors from air exhausted or evacuated from refinery storage tanks and other liquid storage facilities and recovering them in liquified form.

2. Statement of the Prior Art

German patent application P 44 00 456.7-13discloses a method of simultaneously separating organic and inorganic vaporous substances from air or technical gases by direct condensation in a cold scrubber. As there disclosed, a circulating current of recovered condensates is utilized as the refrigerant in the cold scrubber. When operating in a range of moderate temperatures the refrigerant is supercooled by a cold-vapor refrigeration unit, and by a cold-air refrigeration unit when operating at demanding, i.e. very low ranges, temperature parameters. The low temperature component of the pure air is regeneratively utilized for cooling the refrigerant in an upper column of the cold scrubber or for precooling the compressed air of the cold-air refrigeration unit. However, such a process is not suitable for the separation from air of high proportions of light components, i.e components having a low boiling point, or of non-condensible organic substances, because at low overpressure levels and at ambient temperatures only a limited quantity of these components is solvable and can be withdrawn in liquid form at the bottom (sump) of the column. Consequently, the light components accumulate at the middle portion of the cold scrubber and, in the end, they remain within the air to be scrubbed.

Light hydrocarbons of the kind having one or two C atoms cannot be separated from air by condensation at temperatures above −150° C. (≈−101° F.); they are, under such conditions, considered to be non-condensible. In thermal separation processes of substances products not derived from the process itself should preferably not be used as auxiliary agents, lest additional contaminations and additional separation problems result which, in turn, further complicate the production of pure process-integrated substances.

OBJECTS OF THE INVENTION

Therefore, it is a general object of the invention to provide a method of separating vaporous substances gaseous media, to wit air.

A more specific object is to provide a method of the kind referred to by which large proportions of light condensible vaporous components may be separated from gaseous media free from impurities.

Yet another object is to provide a method of separating or recovering from a gaseous medium large proportions of propane or butane.

A further object of the invention resides in the provision of a separation method for non-condensible components such as ethane, for example, from other gaseous media.

Other objects will in part be obvious and will in part appear hereafter.

BRIEF SUMMARY OF THE INVENTION

In accordance with an important aspect of the invention the high proportions of light but condensible components are removed from a cold scrubber in liquid state at low temperatures. Thereafter they are pressurized and after regeneratively utilizing their inherent low temperature component (coldness content) in a heat exchanger, they are recovered as valuable liquids, so that these light substances do not accumulate during the process.

In accordance with the invention, separation of non-condensible components is accomplished by circulating a portion of the condensate of such components and utilizing it not only as a refrigerant in the cold scrubber but also as an absorbent medium for non-condensible components by degassing the circulating refrigerant prior to its being cooled in a refrigeration unit, the heat source for the degassing operation preferably being the heat generated by the compression taking place in the cold-air refrigeration unit.

BRIEF DESCRIPTION OF THE DRAWINGS

The invention will hereafter be described in detail with reference to the accompanying drawings, in which.

DETAILED DESCRIPTION OF THE INVENTION

Figure 1:
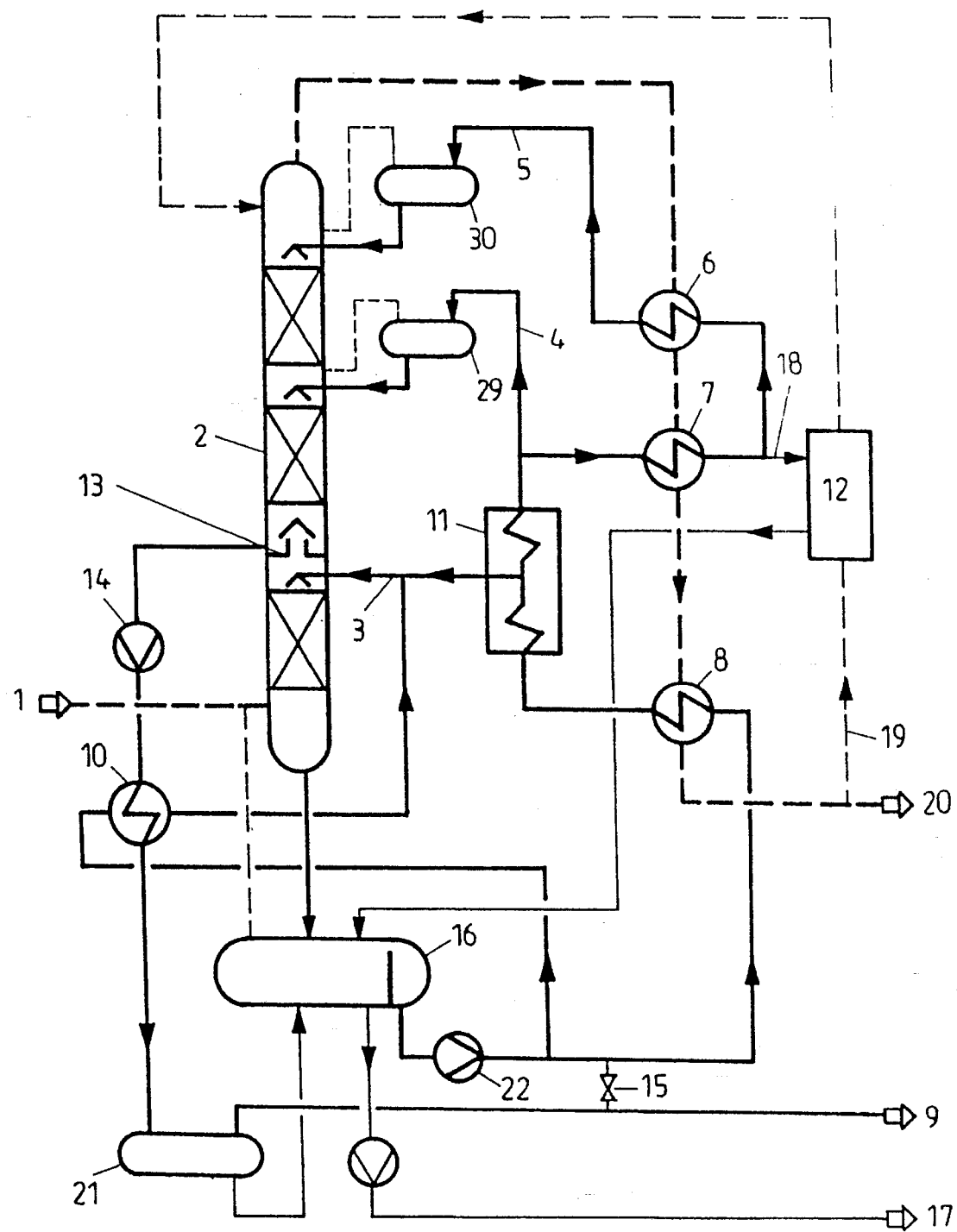
FIG. 1 is a schematic representation of an operating principle applicable at high proportions of condensible light components in a gaseous medium, such as air.
Figure 2:
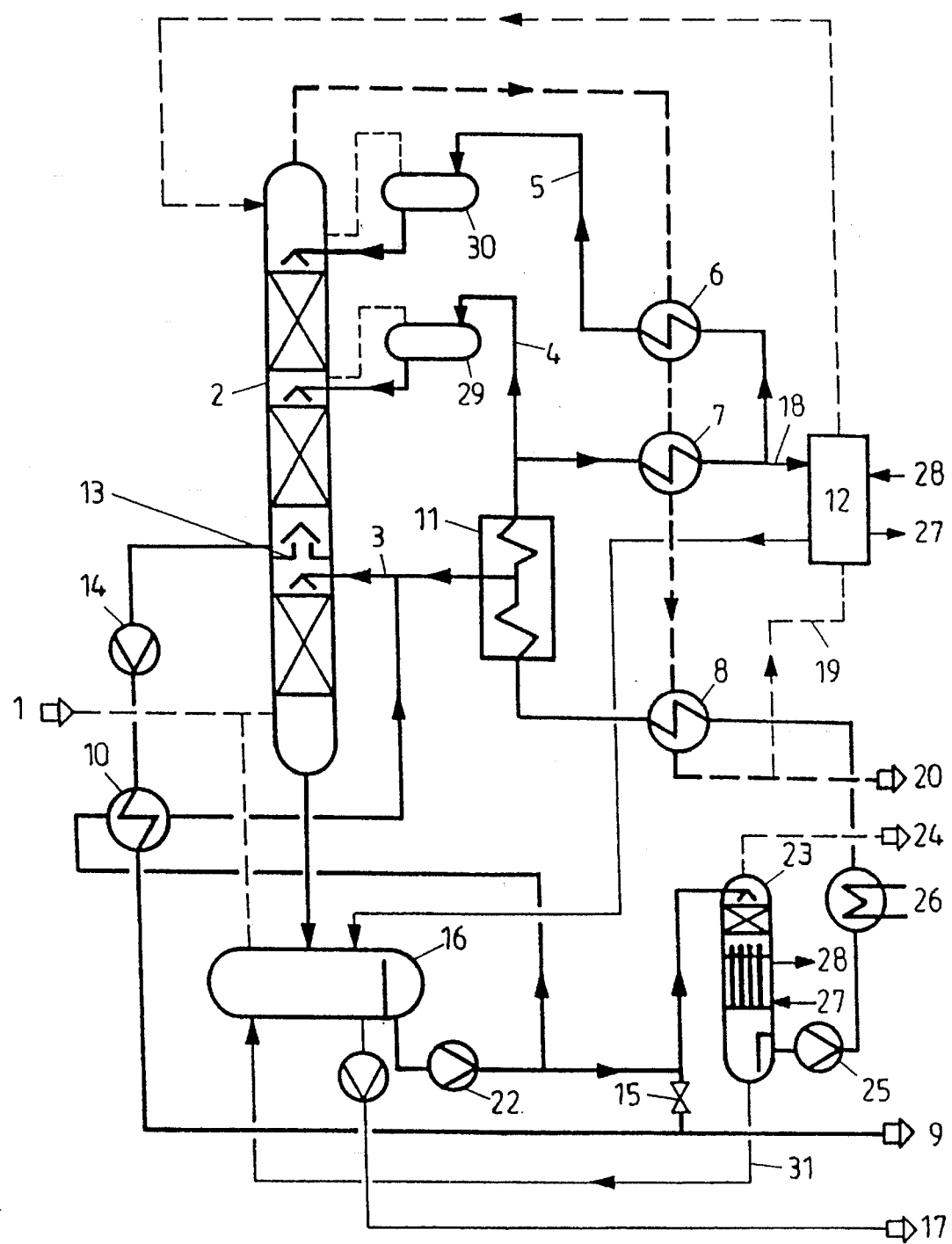
FIG. 2 is a schematic representation of an operating principle applicable at high proportions of condensible light components in a gaseous medium also containing non-condensible light components.

In FIG. 1 which schematically depicts an apparatus for practicing the method in accordance with the invention, a gaseous medium 1 such as air laden with, or containing, a high proportion of organic components with a low boiling point, hereafter sometimes referred to as "light components", is shown to be fed into a cold scrubber 2 below a scrubbing column. It will be understood by those skilled in the art that the gaseous medium mentioned at times hereinafter is intended to include air in general and air polluted by, or laden with, hydrocarbons in a gaseous state, in particular.

As a rule and as shown, the cold scrubber 2 comprises three scrubbing columns. Preferably, the columns are mounted on top of each other, in a stacked arrangement. A removal pan or sump 13 is mounted between the middle scrubber column and the lower scrubber column.

The gaseous medium 1 flows through the cold scrubber in an upward direction. It is thus cooled directly by currents 3, 4, and 5 of refrigerant, and its organic contents are directly condensed. The refrigerant currents 3, 4, and 5 constitute currents of the condensate thus obtained, hereinafter sometimes referred to as "inherent condensate". These currents are cooled in heat exchangers 6, 7, and 8 by regenerative use of the coldness component, i.e. the inherent low temperature, of the scrubbed or clean air withdrawn at the head of the scrubber 2, as well as in a heat exchanger 10 by the liquid 9 to be discharged. They are additionally cooled by extraneous cooling sources, such as by a cold-vapor refrigeration unit 11 providing cooling at moderate temperature parameters and by a coldair refrigeration unit 12 providing cooling at demanding, i.e. very low, temperature parameters. The recovered liquid 9 is withdrawn from the cold scrubber 2 at a position thereof where the temperature is sufficiently low to reduce the light condensible components to their liquid state. The removal sump 13 is located in between the lower and middle scrubber columns at a position at which the light condensible components are present in a liquid phase. The pressure of the removed liquid 9 is raised by a pump 14 before its inherent cold temperature is transferred, in the heat exchanger 10, to the refrigerant used in the lower scrubber column and before the temperature of the pressurized liquid 9 is raised to the level of ambient temperature. The quantity of the circulating portion of the inherent condensate is adjusted by a control unit 15 in response to prevailing liquid levels, provisions being made to ensure that the recovered liquid 9 contains a high proportion of substances having a low boiling point.

A separator or dehydrator 16 is provided for a fine or vernier separation of water 17 which is then discharged from the apparatus.

The cold-vapor refrigeration unit 11 may be a dual-stage unit operating with two vaporizing stages in such a way that the vaporizing stage operating at the higher vaporizing temperature serving the lower scrubber column where the major portion of the water contents is extracted, as indicated by the vertical arrow leading to the separator 16. If only a one-stage cold-vapor unit is available, it would be connected to a special cold scrubber provided with two scrubber columns only, and removal would take place at a position between such columns.

A portion of the scrubbed air current is utilized as the refrigerant of the cold-air refrigeration unit 12. Following cooling in the low-temperature cold-air refrigeration unit 12 the air current is introduced as refrigerant 19 into the head of the cold scrubber 2. For purposes of pre-cooling of the compressed air within the cold-air refrigeration unit 12 a further refrigerant current 18 is fed to the cold-air refrigeration unit 12 which after heat absorption is returned to the separator 16.

If it is desired that the recovered liquid 9 be water-free it will be subjected to a coarse water separation or dehydration at an initial dehydration unit 21 followed by the final or vernier dehydration in the separator 16. The circulating refrigerant currents 3, 4, 9 and 18 are withdrawn from the separator 16 in a substantially anhydrous (water-free) condition and are then returned to the system by a pump 22.

If the gaseous medium 1 contains non-condensible light components, the circulating refrigerant current returned to the heat exchanger 8, or the entire circulating refrigerant current, is thermally degassed in a degassing unit 23. Light components 24 are extracted in vaporous form or, if desired, they are combined with the recovered liquid 9. An aqueous phase 31 is returned to the separator 16. To provide the requisite low temperature for the refrigerant currents 3, 4, 5 and 18 the degassed anhydrous refrigerant is cooled regeneratively by means of a pump 25 and a cooling unit 26 and by cooling provided extraneously. The water-free refrigerant is fed at different temperatures to the cold scrubber 2, as a scrubber medium capable of absorbing light non-condensible components as well as a refrigerant for condensible components. As well as absorbing the non-condensible components the anhydrous refrigerant also directly cools the air and directly condenses the vapors.

Heated injection water of the compressor of the cold-air refrigeration unit 12 may be utilized as a heat medium for use in the degassing unit 23, applied to its intake 27 and removed by its outlet 28.

In case of vast changes in the quantity and/or contents of gaseous media cold storage in refrigerant storage facilities 29, 30 offers a convenient way of raising the efficiency and/or capacity of a separation system otherwise designed for medium levels of efficiency and/or capacity, as well as of suppressing output peaks.

It will be apparent to persons skilled in the art that the method in accordance with the described invention may also be practiced if instead of the lower column of the cold scrubber a separate scrubber tower is utilized intermediate the refrigerant current input and the bottom or sump, and if instead of the removal sump 13, a sump provided in the separate colder scrubber column of the cold scrubber 2 is utilized.

For purposes of accommodating vastly varying quantities of gaseous media per se or of the contents thereof, the apparatus for practicing the invention may be provided with refrigerant storage facilities 29 and 30 "breathing" at, or connected to, the gas inputs of the cold scrubber 2 and which, if needed, could take up or supply pre-cooled refrigerant, thus tremendously improving the economic efficiency of the apparatus.

As compared to methods hitherto practiced, the advantages to be derived from practicing the method in accordance with the invention do not only reside in the fact that the difficult objects can in fact be attained, but also in the fact that the invention provides for an extremely efficient continuous process with low energy consumption and that extraneous media are not required for the separation process. Further advantages reside in low fixed costs as a result of the small dimensions or compactness of the required components. The utilization of refrigerant storage facilities avoids the need for vapor storage facilities in storage tanks. Still another advantage resides in the contraliability of the water vapor contents of the gaseous medium.

It will be apparent to those skilled in the art that certain changes may be made in or to the embodiments described supra without departing from the scope or spirit of the invention. It is thus intended that all matter herein disclosed be interpreted as illustrative only and not as limiting the scope of protection sought.

What is claimed is:

1. A method of separating vaporous substances from a gaseous medium containing a high proportion of at least one component having a low boiling point, comprising the steps of:

cooling said gaseous medium in scrubber means;

providing in said scrubber means a location having a temperature sufficiently low to reduce said component to a liquid condensate having an inherent coldness component;

removing said liquid condensate from said location;

raising the pressure of said liquid condensate;

transferring the coldness component of said liquid condensate to a circulating refrigerant medium to reduce the temperature thereof, thereby raising the temperature of said liquid condensate to ambient temperature;

removing water from said liquid condensate; and recovering said liquid condensate.

2. The method of claim 1, further including the step of transferring said coldness component to circulating refrigerant in a heat exchanger.

3. The method of claim 2, further comprising the step of adjusting the quantitative equilibrium between the recovered liquid condensate and the amount of vaporous substance contained in said gaseous product in accordance with liquid levels thus providing a quantitative equilibrium relative to said circulating refrigerant medium.

4. The method of claim 3, wherein at least some of said liquid condensate is added to said circulating refrigerant medium.

5. A method of separating by condensation and absorption vaporous substances from a gaseous medium containing a high proportion of components having a low boiling point and at least some of which are non-condensible, comprising the steps of:

cooling said gaseous medium in scrubber means;

providing in said scrubber means a location having a temperature sufficiently low to reduce said components to a liquid condensate having an inherent coldness component and containing said non-condensible components solved therein;

removing said liquid condensate including said non-condensible components solved therein;

increasing the pressure of said liquid condensate including said non-condensible components solved therein;

transferring said inherent coldness component to a circulating refrigerant medium to reduce the temperature thereof, thereby raising the temperature of said liquid condensate to ambient temperature;

removing a quantity of liquid condensate equal to the quantity of vaporous substance contained in said gaseous medium;

thermally degassing said removed quantity of liquid condensate and extracting, in vaporous state, said non-condensible components solved therein;

removing water from said liquid condensate;

recirculating said liquid component as a refrigerant with improved absorbability for components having a low boiling point.

6. The method of claim 5, further including the step of transferring said coldness component to said circulating refrigerant in a heat exchanger.

7. The method of claim 5, further including the step of thermally degassing the circulating refrigerant.

8. The method of claim 7, further including the step of moving said gaseous medium from said scrubber means after removal of said liquid condensate to a cold-air refrigeration unit provided with a heat-generating compressor.

9. The method of claim 8, further including the steps of degassing said liquid condensate in a degassing means; and applying the heat generated by said compressor to said degassing means.

10. The method of claim 5, further comprising the step of absorbing excessive quantities of refrigerant in storage means connected to said scrubber means.

11. The method of claim 10, further including the step of dispensing added refrigerant from said storage means.

* * * * *